(12) United States Patent
Teramoto et al.

(10) Patent No.: US 10,145,988 B2
(45) Date of Patent: Dec. 4, 2018

(54) PROJECTION LENS AND PROJECTOR WITH LASER BEAM LIGHT SOURCE

(71) Applicant: Konica Minolta, Inc., Tokyo (JP)

(72) Inventors: Miyuki Teramoto, Osaka (JP);
Yasumasa Sawai, Nara (JP); Koji Takahara, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/072,110

(22) Filed: Mar. 16, 2016

(65) Prior Publication Data

US 2016/0277718 A1   Sep. 22, 2016

(30) Foreign Application Priority Data

Mar. 17, 2015   (JP) .................. 2015-053610

(51) Int. Cl.

| | |
|---|---|
| *G02B 1/115* | (2015.01) |
| *H04N 9/31* | (2006.01) |
| *G02B 1/113* | (2015.01) |
| *G02B 1/118* | (2015.01) |
| *G02B 1/116* | (2015.01) |
| *G02B 1/11* | (2015.01) |
| *H04N 13/04* | (2006.01) |
| *G02B 1/111* | (2015.01) |

(52) U.S. Cl.
CPC .............. *G02B 1/115* (2013.01); *G02B 1/11* (2013.01); *G02B 1/113* (2013.01); *G02B 1/116* (2013.01); *G02B 1/118* (2013.01); *H04N 9/3158* (2013.01); *H04N 9/3161* (2013.01); *H04N 9/3164* (2013.01); *H04N 13/0431* (2013.01); *H04N 13/0459* (2013.01); *G02B 1/111* (2013.01)

(58) Field of Classification Search
CPC ...... G02B 1/115; G02B 27/2207; G02B 1/11; G02B 1/111; G02B 1/113; G02B 1/116; G02B 1/118; G03B 21/2033
See application file for complete search history.

(56) References Cited

U.S. PATENT DOCUMENTS

| | | | | |
|---|---|---|---|---|
| 6,040,881 A * | 3/2000 | Koyama | ................ | G02B 1/115 348/E9.027 |
| 7,379,244 B2 * | 5/2008 | Watanabe | .............. | G02B 1/115 359/586 |
| 7,416,306 B2 * | 8/2008 | Yamamoto | ........... | G03B 21/567 348/750 |
| 7,773,301 B2 * | 8/2010 | Terayama | .......... | G02B 27/0012 359/586 |
| 7,791,803 B2 * | 9/2010 | Terayama | .............. | G02B 1/115 359/570 |

(Continued)

FOREIGN PATENT DOCUMENTS

| | | |
|---|---|---|
| JP | 2001183764 A | 7/2001 |
| JP | 2005266115 A | 9/2005 |

*Primary Examiner* — Bao-Luan Le
(74) *Attorney, Agent, or Firm* — Osha Liang LLP

(57) ABSTRACT

A projection lens included in a projector using laser beams as a light source is provided, the laser beams including as the light source, first blue laser light beams, second blue laser beams, first green laser beams, second green laser beams, first red laser beams, and second red laser beams, which are different in wavelength range. The projection lens has a relative maximum value of a transmittance on an optical axis between a wavelength not shorter than 645 nm and a wavelength not longer than 680 nm.

11 Claims, 26 Drawing Sheets

| | Air | INDEX OF REFRACTION | PHYSICAL FILM THICKNESS(nm) |
|---|---|---|---|
| 5 | MgF2 | 1.385 | 95.1 |
| 4 | TiO2+La2O3 | 2.1 | 121.5 |
| 3 | AL2O3 | 1.62 | 101.2 |
| 2 | MgF2 | 1.385 | 21.7 |
| 1 | AL2O3 | 1.62 | 161.2 |
| | BK7 | | |

(56) References Cited

U.S. PATENT DOCUMENTS

| | | | | |
|---|---|---|---|---|
| 8,070,297 B2* | 12/2011 | Kamijima | | H04N 9/3129 |
| | | | | 353/101 |
| 8,248,699 B2* | 8/2012 | Terayama | | G02B 1/115 |
| | | | | 359/581 |
| 8,481,148 B2* | 7/2013 | Adachi | | G02B 1/115 |
| | | | | 351/159.01 |
| 8,746,888 B2* | 6/2014 | Silverstein | | H04N 9/3117 |
| | | | | 348/60 |
| 9,135,891 B2* | 9/2015 | Seo | | G09G 5/14 |
| 9,335,541 B2* | 5/2016 | Silverstein | | G02B 27/2207 |
| 9,651,790 B2* | 5/2017 | Takahara | | G02B 27/126 |
| 9,819,918 B2* | 11/2017 | Takahara | | G02B 27/1026 |
| 9,874,806 B2* | 1/2018 | Takahara | | G02B 5/04 |
| 2004/0184007 A1* | 9/2004 | Silverstein | | G02B 13/22 |
| | | | | 353/20 |
| 2005/0170180 A1* | 8/2005 | Kawa | | B32B 27/36 |
| | | | | 428/402 |
| 2006/0158725 A1* | 7/2006 | Yamamoto | | G03B 21/567 |
| | | | | 359/449 |
| 2007/0159697 A1* | 7/2007 | Terayama | | G02B 1/115 |
| | | | | 359/586 |
| 2008/0231957 A1* | 9/2008 | Terayama | | G02B 1/115 |
| | | | | 359/586 |
| 2009/0141252 A1* | 6/2009 | Kamijima | | H04N 9/3129 |
| | | | | 353/85 |
| 2009/0290219 A1* | 11/2009 | Terayama | | G02B 1/115 |
| | | | | 359/586 |
| 2011/0033681 A1* | 2/2011 | Adachi | | G02B 1/115 |
| | | | | 428/212 |
| 2012/0276350 A1* | 11/2012 | Terayama | | G02B 1/115 |
| | | | | 428/212 |
| 2013/0083081 A1* | 4/2013 | Silverstein | | H04N 9/3117 |
| | | | | 345/690 |
| 2013/0182320 A1* | 7/2013 | Silverstein | | G02B 27/2207 |
| | | | | 359/464 |
| 2013/0182322 A1* | 7/2013 | Silverstein | | G02C 7/107 |
| | | | | 359/464 |
| 2013/0335458 A1* | 12/2013 | Seo | | G09G 5/14 |
| | | | | 345/690 |
| 2013/0342904 A1* | 12/2013 | Richards | | H04N 13/0422 |
| | | | | 359/464 |
| 2014/0078589 A1* | 3/2014 | Fujii | | G02B 1/115 |
| | | | | 359/601 |
| 2015/0160462 A1* | 6/2015 | Takahara | | G02B 27/126 |
| | | | | 359/634 |
| 2016/0309126 A1* | 10/2016 | Takahara | | G02B 27/1026 |
| 2016/0363851 A1* | 12/2016 | Takahara | | G02B 5/04 |

* cited by examiner

FIG.4

| | | INDEX OF REFRACTION | PHYSICAL FILM THICKNESS(nm) |
|---|---|---|---|
| | Air | | |
| 8 | MgF2 | 1.385 | 95.5 |
| 7 | TiO2+La2O3 | 2.1 | 144.9 |
| 6 | MgF2 | 1.385 | 23.8 |
| 5 | TiO2+La2O3 | 2.1 | 54.5 |
| 4 | MgF2 | 1.385 | 8.2 |
| 3 | TiO2+La2O3 | 2.1 | 86.0 |
| 2 | MgF2 | 1.385 | 26.0 |
| 1 | TiO2+La2O3 | 2.1 | 18.8 |
| | BK7 | | |

FIG.6

|   | Air | INDEX OF REFRACTION | PHYSICAL FILM THICKNESS(nm) |
|---|---|---|---|
| 8 | MgF2 | 1.385 | 95.4 |
| 7 | TiO2+La2O3 | 2.1 | 142.4 |
| 6 | MgF2 | 1.385 | 27.6 |
| 5 | TiO2+La2O3 | 2.1 | 45.3 |
| 4 | MgF2 | 1.385 | 14.4 |
| 3 | TiO2+La2O3 | 2.1 | 93.0 |
| 2 | MgF2 | 1.385 | 13.3 |
| 1 | TiO2+La2O3 | 2.1 | 23.5 |
|   | LAC8 | | |

FIG.8

| | Air | INDEX OF REFRACTION | PHYSICAL FILM THICKNESS(nm) |
|---|---|---|---|
| 5 | MgF2 | 1.385 | 95.1 |
| 4 | TiO2+La2O3 | 2.1 | 121.5 |
| 3 | AL2O3 | 1.62 | 101.2 |
| 2 | MgF2 | 1.385 | 21.7 |
| 1 | AL2O3 | 1.62 | 161.2 |
| | BK7 | | |

FIG.10

| | | INDEX OF REFRACTION | PHYSICAL FILM THICKNESS(nm) |
|---|---|---|---|
| | Air | | |
| 4 | MgF2 | 1.385 | 93.3 |
| 3 | TiO2+La2O3 | 2.1 | 124.1 |
| 2 | AL2O3 | 1.62 | 100.6 |
| 1 | MgF2 | 1.385 | 26.6 |
| | BK7 | | |

FIG.21

|  | ON OPTICAL AXIS ||| OFF OPTICAL AXIS |||
| --- | --- | --- | --- | --- | --- | --- |
|  | NO CHANGE | CHANGE IN HALF | CHANGE IN ALL | NO CHANGE | CHANGE IN HALF | CHANGE IN ALL |
| TOTAL-SYSTEM TRANSMITTANCE | 92.7 | 93.5 | 94.6 | 83.1 | 84.0 | 85.3 |
| B(440-470nm) | 89.9 | 91.6 | 93.5 | 86.6 | 88.1 | 89.6 |
| G(520-560nm) | 93.2 | 93.9 | 95.5 | 89.3 | 89.5 | 91.5 |
| R(630-665nm) | 94.6 | 94.7 | 94.6 | 72.9 | 74.3 | 74.5 |

FIG.23

| | | DETAILS OF CHANGE | | | | |
|---|---|---|---|---|---|---|
| | | NO CHANGE | CHANGE IN ALL | CHANGE IN AB | CHANGE IN AC | CHANGE IN BC |
| LENS POSITION | Gr-A | — | ○ | ○ | ○ | — |
| | Gr-B | — | ○ | ○ | — | ○ |
| | Gr-C | — | ○ | — | ○ | ○ |

FIG.26

| | ON OPTICAL AXIS | | | | | OFF OPTICAL AXIS | | | | |
|---|---|---|---|---|---|---|---|---|---|---|
| | NO CHANGE | CHANGE IN ALL | CHANGE IN AB | CHANGE IN AC | CHANGE IN BC | NO CHANGE | CHANGE IN ALL | CHANGE IN AB | CHANGE IN AC | CHANGE IN BC |
| W(B,G,R) | 90.5 | 92.6 | 91.7 | 91.9 | 92.2 | 85.9 | 89.1 | 88.0 | 88.4 | 87.8 |
| B(440-470) | 88.6 | 88.9 | 88.3 | 88.7 | 89.3 | 85.0 | 86.5 | 86.0 | 86.3 | 85.7 |
| G(520-560) | 90.6 | 94.2 | 93.0 | 92.9 | 93.0 | 89.0 | 93.0 | 91.6 | 91.6 | 91.7 |
| R(630-665) | 92.1 | 94.1 | 93.0 | 93.5 | 93.8 | 83.3 | 87.0 | 85.8 | 86.5 | 85.0 |

PROJECTION LENS AND PROJECTOR WITH LASER BEAM LIGHT SOURCE

CROSS-REFERENCE TO RELATED APPLICATIONS

This application claims priority under 35 U.S.C. § 119(a) to Japanese Patent Application No. 2015-053610, filed on Mar. 17, 2015. Japanese Patent Application No. 2015-053610 is incorporated herein by reference in its entirety.

BACKGROUND

Technological Field

This invention relates to a projection lens and a projector.

Description of the Related Art

An exemplary invention mentioning color balance in a projector is shown below. Japanese Laid-Open Patent Publication No. 2005-266115 discloses a technique for improving color balance by devising arrangement in connection with splitting and synthesis by dichroic mirrors in a liquid crystal projector. Japanese Laid-Open Patent Publication No. 2001-183764 discloses a technique for improving a color temperature or color purity by restricting a transmission wavelength in a liquid crystal projector.

A projector including a lamp light source is different in lamp intensity depending on a wavelength. For example, in accordance with intensity distribution, importance has been placed on a transmittance of a red wavelength range around 620 nm representing a relatively shorter wavelength, and in spite of a low transmittance around 650 nm, a severe problem has not arisen in brightness or color tone of an image.

A projector including a laser light source is disadvantageous in that brightness or a color tone of an image becomes poor when a transmittance in the vicinity of a wavelength of laser beams is low.

With respect to brightness of an image, a projector including a laser light source is desirably low in reflectance of all wavelengths corresponding to three colors of blue, green, and red. A quantity of light, however, tends to be insufficient in particular in a red region due to influence by a bandwidth of an antireflection coating on a surface of a lens.

SUMMARY

A projection lens and a projector according to one or more embodiments can overcome an insufficient quantity of light in a red region by placing importance on a transmittance of a red region.

A projection lens based on one aspect of this invention is directed to a projection lens included in a projector using laser beams as a light source, the laser beams including as the light source, first blue laser beams, second blue laser beams, first green laser beams, second green laser beams, first red laser beams, and second red laser beams, which are different in wavelength range, and the projection lens having a relative maximum value of a transmittance on an optical axis between a wavelength not shorter than 645 nm and a wavelength not longer than 680 nm.

A projector based on another aspect of this invention includes the projection lens described above.

A projection lens in another aspect of this invention is directed to a projection lens included in a projector using laser beams as a light source, the laser beams including as the light source, first blue laser beams, second blue laser beams, first green laser beams, second green laser beams, first red laser beams, and second red laser beams, which are different in wavelength range, and the projection lens having a relative maximum value of a transmittance on an optical axis in a range of wavelengths not shorter than 645 nm.

A projection lens in yet another aspect of this invention is directed to a projection lens included in a projector including a light source, the light source including a first blue light source, a second blue light source, a first green light source, a second green light source, a first red light source, and a second red light source, which are different in wavelength range, and the projection lens having a relative maximum value of a transmittance on an optical axis between a wavelength not shorter than 645 nm and a wavelength not longer than 680 nm.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, and wherein:

FIG. 4 is a diagram showing a construction of an antireflection coating of a lens in Example 1;

FIG. 6 is a diagram showing a construction of an antireflection coating of a lens in Example 2;

FIG. 8 is a diagram showing a construction of an antireflection coating of a lens in Example 3;

FIG. 10 is a diagram showing a construction of a reflection coating of a lens in Comparative Example 1;

FIG. 21 is a diagram showing relation between the number of applied lenses to which the antireflection coating of the projection lens in Example 7 has been applied and a transmittance;

FIG. 23 is a diagram showing grouping of the projection lens in Example 8;

FIG. 26 is a diagram showing relation between a transmittance and "no change," "change in all," "change in AB," "change in AC," and "change in BC" of lenses to which the antireflection coating of the projection lens in Example 8 has been applied.

DETAILED DESCRIPTION OF EMBODIMENTS

Figure 1:
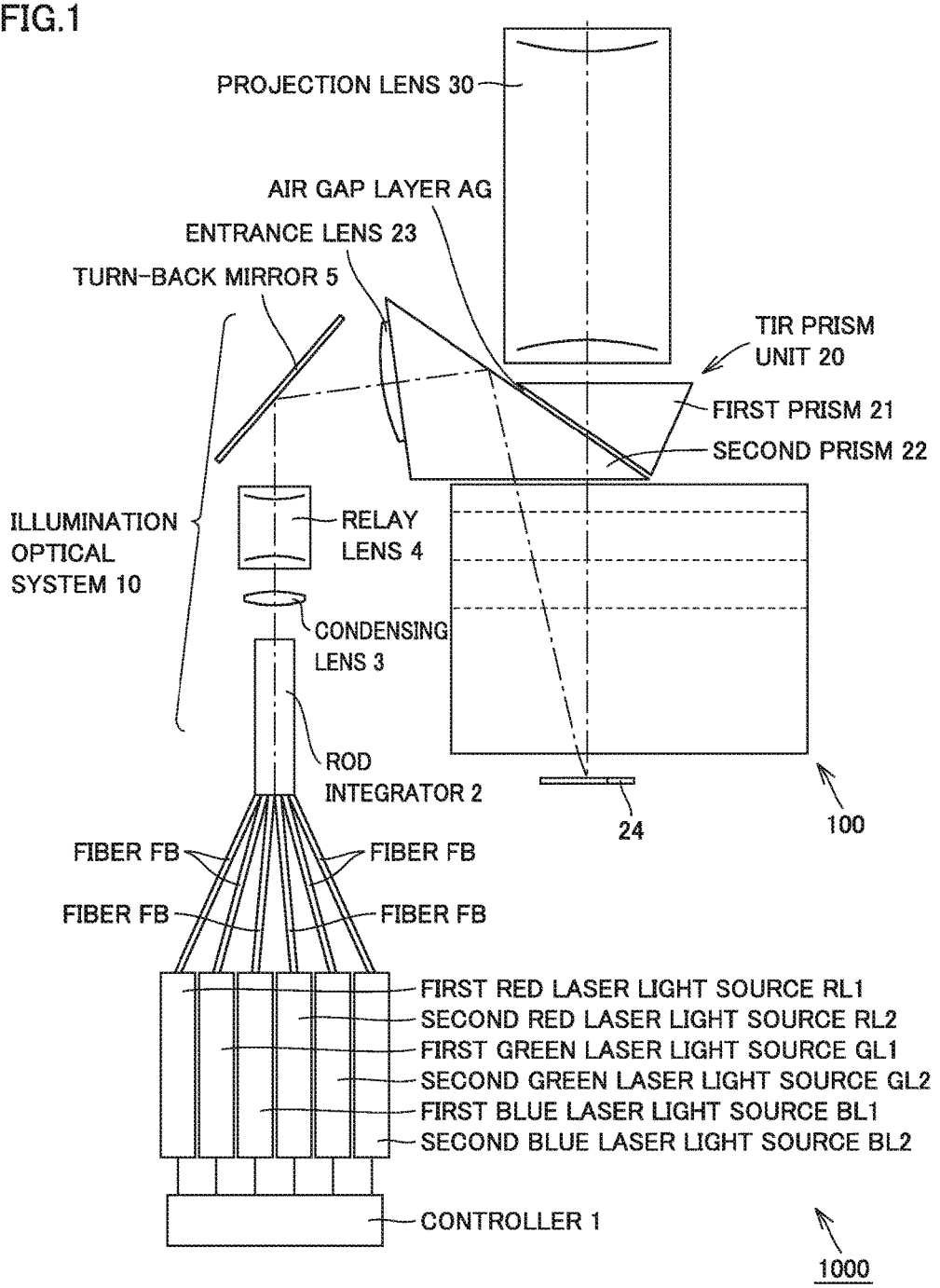
FIG. 1 is a diagram showing an overall construction of a projector according to one or more embodiments.

Hereinafter, embodiments of the present invention will be described with reference to the drawings. However, the scope of the invention is not limited to the illustrated examples.

A projection lens for a projector and a projector including the same according to one or more embodiments of this invention will be described with reference to the drawings. The scope of the present invention is not necessarily limited to the number or the amount described herein unless otherwise specified. The same or corresponding elements have the same reference numeral allotted and redundant description may not be repeated. Illumination light and projected light shown in each figure below illustrate principal rays.

Embodiments of the invention relate to a projection lens and a projector, for example, to a projection lens for projecting an image shown by an image display element such as a digital micromirror device or a liquid crystal display (LCD) on a screen and to a projector including the same.

A scheme in which laser beams having two wavelengths in each color of R, G, and B are used as illumination light is available as one scheme for display with a three-dimension (3D) projector. Specifically, by splitting beams into separate optical paths and then synthesizing the beams depending on a difference between two wavelengths of each color or a difference in polarization, two different color images for right and left eyes can be displayed.

In a conventional projector including a lamp light source, in accordance with distribution of wavelengths of lamp intensity, importance has been placed on a transmittance of a red wavelength range around 620 nm representing a relatively short wavelength, and in spite of a low transmittance around 650 nm, a severe problem has not arisen in brightness or color tone of an image. When a laser light source is used, brightness or a color tone of an image disadvantageously extremely becomes poor when a transmittance in the vicinity of a wavelength of laser beams is low.

A transmittance of a lens is affected mainly by absorption loss in a glass material for a projection lens and a spectral transmittance of an antireflection coating provided on a surface of the lens. Loss in the glass material is determined by selection of a glass material in optical design, and hence it is realistic to control balance of wavelengths based on a spectral transmittance of the antireflection coating.

In some conventional cases, a filter for dimming light of a color large in quantity has been adopted for controlling color balance. With this method, however, some of light from a light source is intentionally cut, and it has accordingly been necessary to raise power of a source of that spectrum, which is not efficient.

According to one or more embodiments, to make improvements with respect to brightness of an image in using a laser light source, a reflectance of all wavelengths of three colors of blue (having a wavelength from 440 nm to 470 nm), green (having a wavelength from 520 nm to 560 nm), and red (having a wavelength from 630 nm to 665 nm) is desirably low. A quantity of light tends to be insufficient in particular in a red region due to influence by a bandwidth of an antireflection coating on a surface of a lens. Therefore, one or more embodiments can overcome an insufficient quantity of light in a red region by focusing on a transmittance of a red region.

A wavelength range from 645 nm to 680 nm and a wavelength range from 530 nm to 570 nm are shifted toward a longer wavelength by 10 nm to 15 nm from the wavelength ranges of laser beams above, on the premise that a transmittance of off-axis light shifts toward a shorter wavelength.

Wavelengths in two bands are used for each of R, G, and B in 3D representation, and desirably, a quantity of light is large in the two bands and a difference in quantity of light between the two bands is small. Therefore, from one point of view, such a condition has been set that a transmittance has a relative maximum value and a reflectance has a relative minimum value in wavelength ranges designated (a range between a wavelength not shorter than 645 nm and a wavelength not longer than 680 nm and a range between a wavelength not shorter than 530 nm and 570 nm) for the two wavelengths for each color.

From another point of view, with importance being placed on a transmittance and a reflectance of off-axis light, such a condition has been set that an extreme value is present in particular toward a longer wavelength in the two wavelengths (a range between a wavelength not shorter than 645 nm and a wavelength not longer than 680 nm and a range between a wavelength not shorter than 530 nm and 570 nm). The condition is such that a transmittance has a relative maximum value and a reflectance has a relative minimum value.

A projector and a projection lens adopted in the projector according to one or more embodiments will be described below with reference to the drawings.

(Projector 1000)

Figure 2:
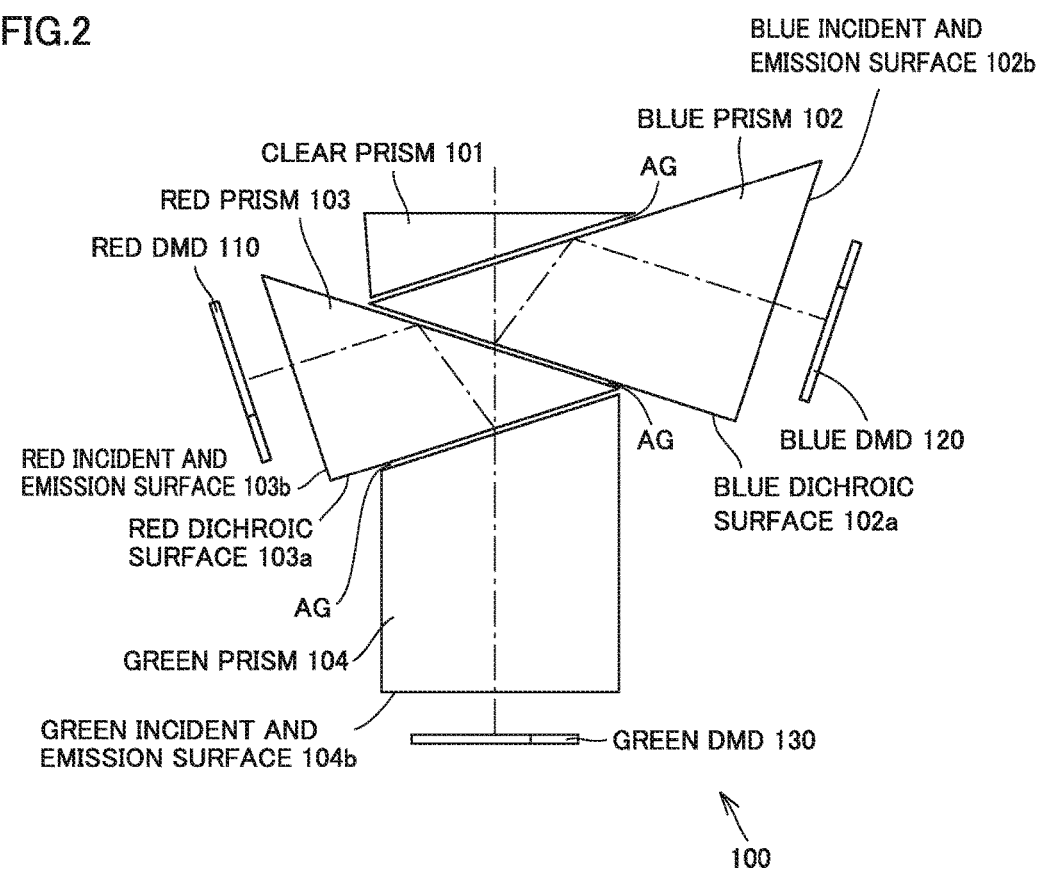
FIG. 2 is a diagram showing an overall construction of a color prism unit according to one or more embodiments.

A construction of a projector 1000 will be described with reference to FIGS. 1 and 2. FIG. 1 is a diagram showing an overall construction of the projector and FIG. 2 is a diagram showing an overall construction of a color prism unit. A light source is constituted of a first blue laser light source BL1 having a wavelength of 445 nm, a second blue laser light source BL2 having a wavelength of 465 nm, a first green laser light source GL1 having a wavelength of 525 nm, a second green laser light source GL2 having a wavelength of 547 nm, a first red laser light source RL1 having a wavelength of 637 nm, and a second red laser light source RL2 having a wavelength of 657 nm. Each laser light source is controlled by a controller 1.

Each laser light source is incident on a rod integrator 2 via a fiber FB. Light incident on rod integrator 2 repeats internal reflection therein and is emitted from an emission surface at the other end, with distribution of quantities of light being uniform. A condensing lens 3 is arranged immediately behind the emission surface of rod integrator 2. A relay optical system 4 is arranged behind condensing lens 3.

Light emitted from rod integrator 2 is efficiently guided by condensing lens 3 to relay optical system 4, turned back by turn-back mirror 5, passes through an entrance lens 23 arranged on an incident side of a total internal reflection (TIR) prism unit 20, TIR prism unit 20, and a color prism unit 100, and illuminates a DMD 24. Components from rod integrator 2 to entrance lens 23 is defined as an illumination optical system 10.

TIR prism unit 20 has a first prism 21 and a second prism 22 each in a substantially triangular prism shape, and an air gap layer AG is provided between inclined surfaces of the prisms. This TIR prism unit 20 separates input light to DMD 24 and output light therefrom from each other.

Illumination light emitted from illumination optical system 10 enters second prism 22, is incident on the inclined surface forming air gap layer AG at an angle satisfying a total reflection condition, where the illumination light is totally reflected, and enters color prism unit 100. The illumination light is split by color prism unit 100 into red, green, and blue. As shown in FIG. 2, color prism unit 100 is combination of a clear prism 101, a blue prism 102, and a red prism 103 each in a substantially triangular prism shape, and a green prism 104 in a block.

Air gap layer AG is provided between clear prism 11 and blue prism 102, and is inclined with respect to an axis of projected light. A surface defined by the axis of the projected light and a normal to air gap layer AG is orthogonal to a surface defined by air gap layer AG of TIR prism unit 20 and the axis of the projected light.

A blue dichroic surface 102a reflecting blue light and air gap layer AG adjacent thereto are provided between blue prism 102 and red prism 103. This air gap layer AG is inclined with respect to the axis of the projected light, and a surface defined by the axis of the projected light and a normal to air gap layer AG is orthogonal to the surface defined by air gap layer AG of TIR prism unit 20 and the axis of the projected light. A direction of inclination is opposite to a direction of inclination of air gap layer AG between clear prism 101 and blue prism 102.

A red dichroic surface 103a reflecting red light and air gap layer AG adjacent thereto are provided between red prism 103 and green prism 104. This air gap layer AG is also inclined with respect to the axis of the projected light, and a surface defined by the axis of the projected light and a normal to air gap layer AG is similarly orthogonal to the surface defined by the normal to air gap layer AG of TIR prism unit 20 and the axis of the projected light. A direction of inclination is the same as the direction of inclination of air gap layer AG between clear prism 101 and blue prism 102.

The illumination light incident on an incident and emission surface of clear prism 101 passes through clear prism 101 and thereafter enters blue prism 102. Blue light is reflected by blue dichroic surface 102a and other red and green light passes therethrough.

The blue light reflected by blue dichroic surface 102a is totally reflected by air gap layer AG on a side of the clear prism and emitted from a blue incident and emission surface 102b which is a surface on a side of the blue prism, and illuminates a blue DMD 120.

Of the red and green light which has passed through blue dichroic surface 102b, the red light is reflected by red dichroic surface 103a and the green light passes therethrough. The red light reflected by red dichroic surface 103a is totally reflected by air gap layer AG provided adjacently to red dichroic surface 103a and emitted from a red incident and emission surface 103b which is a surface on a side of the red prism, and illuminates a red DMD 110.

The green light which has passed through red dichroic surface 103a is emitted from a green incident and emission surface 104b which is a lower surface of green prism 104 and illuminates a green DMD 130.

Blue projected light reflected by blue DMD 120 is incident on blue incident and emission surface 102b and totally reflected by air gap layer AG on the side of clear prism 101 and thereafter reflected by blue dichroic surface 102a.

Red projected light reflected by red DMD 110 is incident on red incident and emission surface 103b, totally reflected by air gap layer AG provided adjacently to blue dichroic surface 102b, and thereafter reflected by red dichroic surface 103a, and further passes through blue dichroic surface 102a.

Green projected light reflected by green DMD 130 is incident on green incident and emission surface 104b and passes through red dichroic surface 103a and blue dichroic surface 102a.

Thereafter, projected light beams of red, blue, and green are synthesized on the same optical axis, emitted from the incident and emission surface of clear prism 101, and incident on TIR prism unit 20. The projected light incident on TIR prism unit 20 passes through air gap layer AG because it does not satisfy a total reflection condition, and is projected on a screen (not shown) through a projection lens 30.

A set of first red laser light source RL1, first blue laser light source BL1, and first green laser light source GL1 and a set of second red laser light source RL2, second blue laser light source BL2, and second green laser light source GL2 are controlled by controller 1 so as to alternately emit light.

While first red laser light source RL1, first blue laser light source BL1, and first green laser light source GL1 emit light, an image for left eye is displayed on the DMD, and while second red laser light source RL2, second blue laser light source BL2, and second green laser light source GL2 emit light, an image for right eye is displayed on the DMD.

A viewer can view a 3D image by wearing over the left eye, a filter which allows passage of only light from first red laser light source RL1, first blue laser light source BL1, and first green laser light source GL1 and wearing over the right eye, a filter which allows passage of only light from second red laser light source RL2, second blue laser light source BL2, and second green laser light source GL2.

(Projector 2000)

Figure 3:
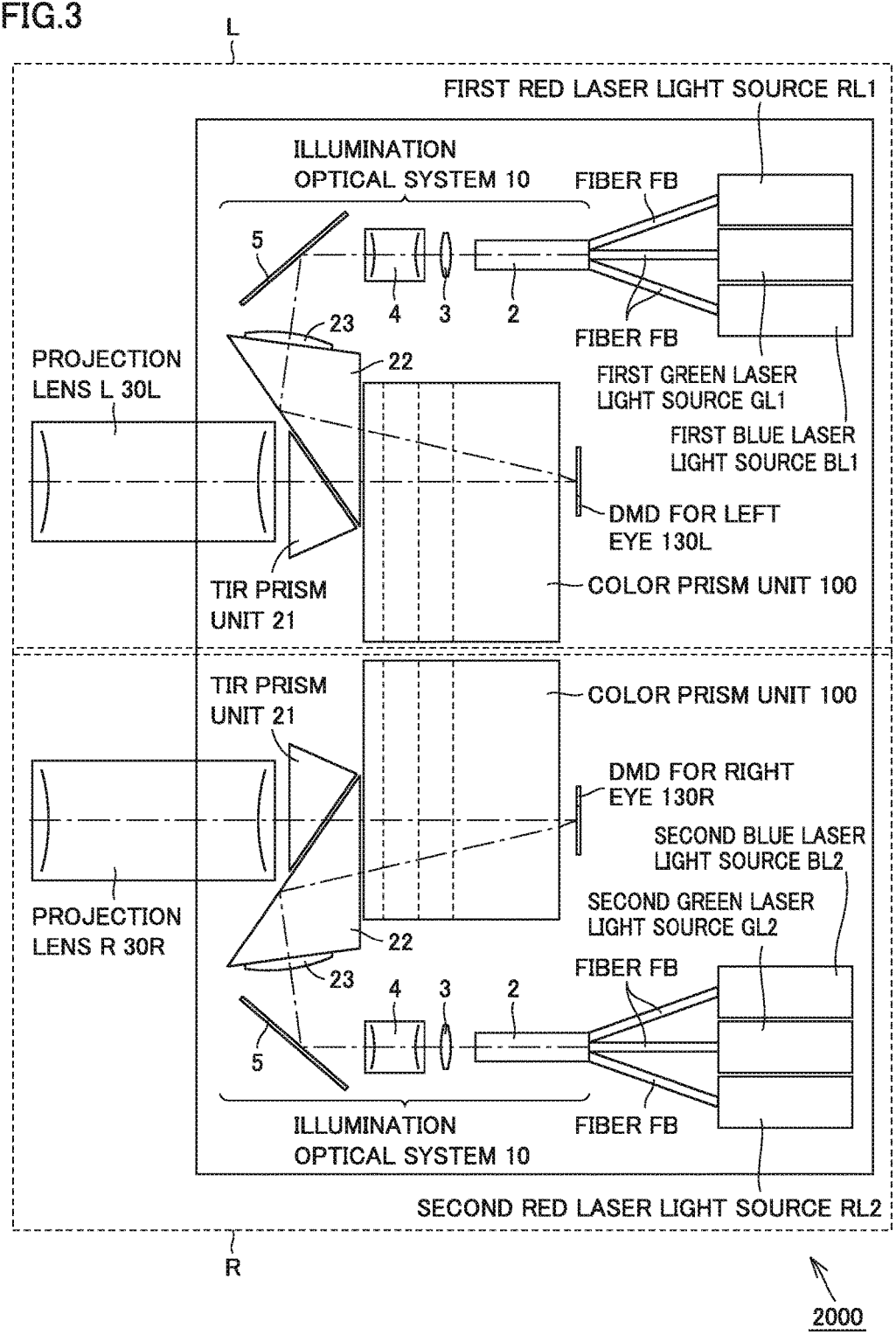
FIG. 3 is a diagram showing an overall construction of another projector according to one or more embodiments.

A construction of a projector 2000 implementing 3D projection with two sets of optical systems will now be described with reference to FIG. 3. FIG. 3 is a diagram showing an overall construction of projector 2000.

First red laser light source RL1, first blue laser light source BL1, and first green laser light source GL1 are arranged in a first optical system L, and second red laser light source RL2, second blue laser light source BL2, and second green laser light source GL2 are arranged in a second optical systems R.

With a function the same as in the optical system in FIGS. 1 and 2, first optical system L and second optical system R project an image for left eye by using first red laser light source RL1, first blue laser light source BL1, and first green laser light source GL1 through a projection lens 30L of first optical system L and an image for right eye by using second red laser light source RL2, second blue laser light source BL2, and second green laser light source GL2 through a projection lens 30R of second optical system R, respectively.

A viewer can view a 3D image by wearing over the left eye, a filter which allows passage of only light from first red laser light source RL1, first blue laser light source BL1, and first green laser light source GL1 and wearing over the right eye, a filter which allows passage of only light from second red laser light source RL2, second blue laser light source BL2, and second green laser light source GL2.

In a case of this projector 2000, unlike projector 1000 shown in FIG. 1, continuously projected images enter the left and right eyes of the viewer, and hence comfortable 3D images without flickering can be viewed.

A projection lens according to one or more embodiments which will be described later can be applied to any of projection lens 30 of projector 1000 and projection lenses 30L and 30R of projector 2000.

EXAMPLE 1

Figure 5:
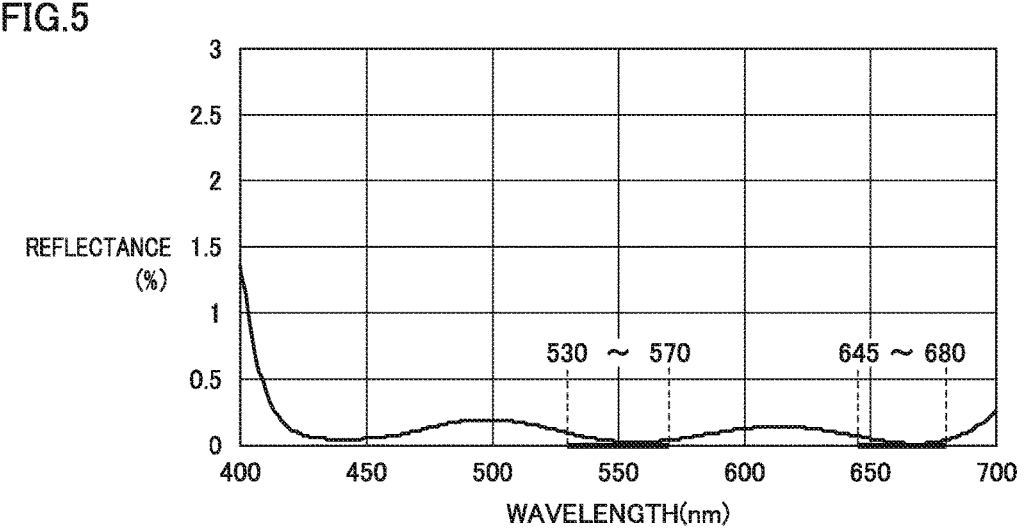
FIG. 5 is a diagram showing a spectral reflectance in Example 1.

FIG. 4 shows a construction of an antireflection coating of a lens in Example 1 and FIG. 5 shows a spectral reflectance in Example 1. BK7 is employed for the lens shown in FIG. 4, and $TiO_2+La_2O_3$ (having an index of refraction of 2.1 and a physical film thickness of 18.8 nm), $MgF_2$ (having an index of refraction of 1.385 and a physical film thickness of 26.0 nm), $TiO_2+La_2O_3$ (having an index of refraction of 2.1 and a physical film thickness of 86.0 nm), $MgF_2$ (having an index of refraction of 1.385 and a physical film thickness of 8.2 nm), $TiO_2+La_2O_3$ (having an index of refraction of 2.1 and a physical film thickness of 54.5 nm), $MgF_2$ (having an index of refraction of 1.385 and a physical film thickness of 23.8 nm), $TiO_2+La_2O_3$ (having an index of refraction of 2.1 and a physical film thickness of 144.9 nm), and $MgF_2$ (having an index of refraction of 1.385 and a physical film thickness of 95.5 nm) are successively stacked as a first layer film, a second layer film, a third layer film, a fourth layer film, a fifth layer film, a sixth layer film, a seventh layer film, and an eighth layer film, respectively.

Consequently, as seen in a graph showing relation between a wavelength (nm) and a reflectance (%) shown in FIG. 5, a reflectance of the antireflection coating has a relative minimum value in a range of wavelengths from 645 nm to 680 nm and also in a range of wavelengths from 530 nm to 570 nm.

EXAMPLE 2

Figure 7:
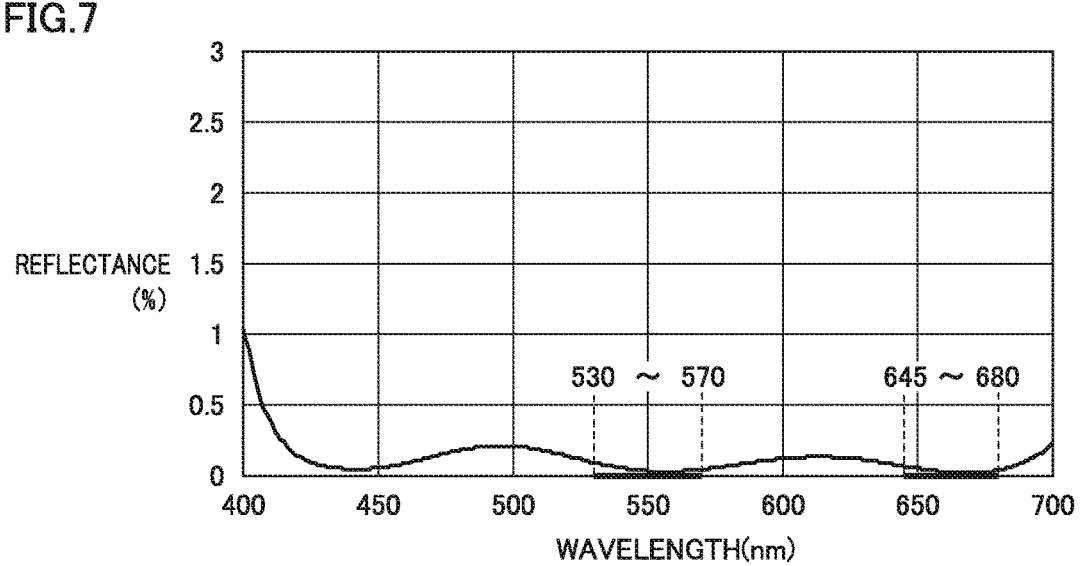
FIG. 7 is a diagram showing a spectral reflectance in Example 2.

FIG. 6 shows a construction of an antireflection coating of a lens in Example 2 and FIG. 7 shows a spectral reflectance in Example 2. LAC8 is employed for the lens shown in FIG. 6, and $TiO_2+La_2O_3$ (having an index of refraction of 2.1 and a physical film thickness of 23.5 nm), $MgF_2$ (having an index of refraction of 1.385 and a physical film thickness of 13.3 nm), $TiO_2+La_2O_3$ (having an index of refraction of 2.1 and a physical film thickness of 93.0 nm), $MgF_2$ (having an index of refraction of 1.385 and a physical film thickness of 14.4 nm), $TiO_2+La_2O_3$ (having an index of refraction of 2.1 and a physical film thickness of 45.3 nm), $MgF_2$ (having an index of refraction of 1.385 and a physical film thickness of 27.6 nm), $TiO_2+La_2O_3$ (having an index of refraction of 2.1 and a physical film thickness of 142.4 nm), and $MgF_2$ (having an index of refraction of 1.385 and a physical film thickness of 95.4 nm) are successively stacked as a first layer film, a second layer film, a third layer film, a fourth layer film, a fifth layer film, a sixth layer film, a seventh layer film, and an eighth layer film, respectively.

Consequently, as seen in a graph showing relation between a wavelength (nm) and a reflectance (%) shown in FIG. 7, a reflectance of the antireflection coating has a relative minimum value in a range of wavelengths from 645 nm to 680 nm and also in a range of wavelengths from 530 nm to 570 nm.

EXAMPLE 3

Figure 9:
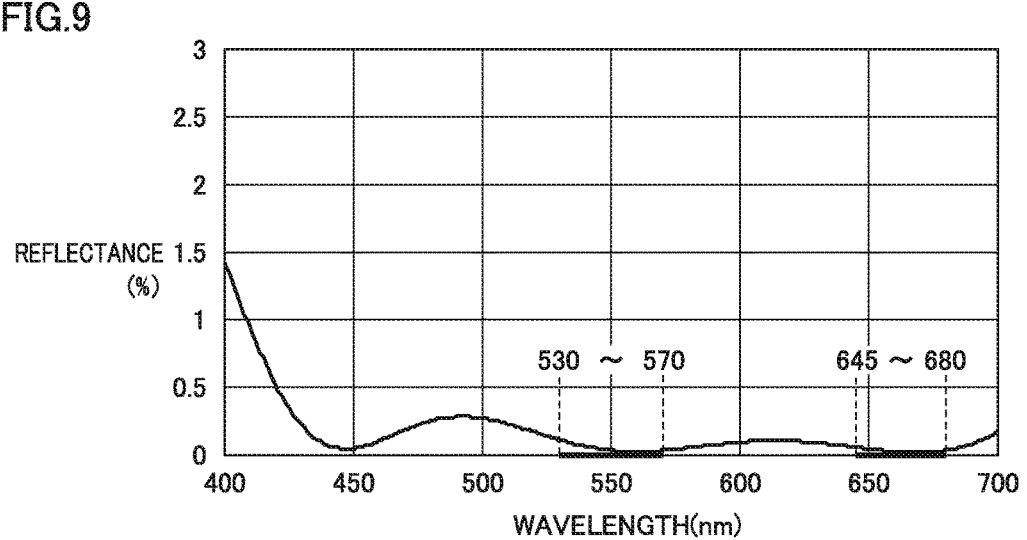
FIG. 9 is a diagram showing a spectral reflectance in Example 3.

FIG. 8 shows a construction of an antireflection coating of a lens in Example 3 and FIG. 9 shows a spectral reflectance in Example 3. BK7 is employed for the lens shown in FIG. 8, and $AL_2O_3$ (having an index of refraction of 1.62 and a physical film thickness of 161.2 nm), $MgF_2$ (having an index of refraction of 1.385 and a physical film thickness of 21.7 nm), $AL_2O_3$ (having an index of refraction of 1.62 and a physical film thickness of 101.2 nm), $TiO_2+La_2O_3$ (having an index of refraction of 2.1 and a physical film thickness of 121.5 nm), and $MgF_2$ (having an index of refraction of 1.385 and a physical film thickness of 95.1 nm) are successively stacked as a first layer film, a second layer film, a third layer film, a fourth layer film, and a fifth layer film, respectively.

Consequently, as seen in a graph showing relation between a wavelength (nm) and a reflectance (%) shown in FIG. 9, a reflectance of the antireflection coating has a relative minimum value in a range of wavelengths from 645 nm to 680 nm and also in a range of wavelengths from 530 nm to 570 nm.

COMPARATIVE EXAMPLE 1

Figure 11:
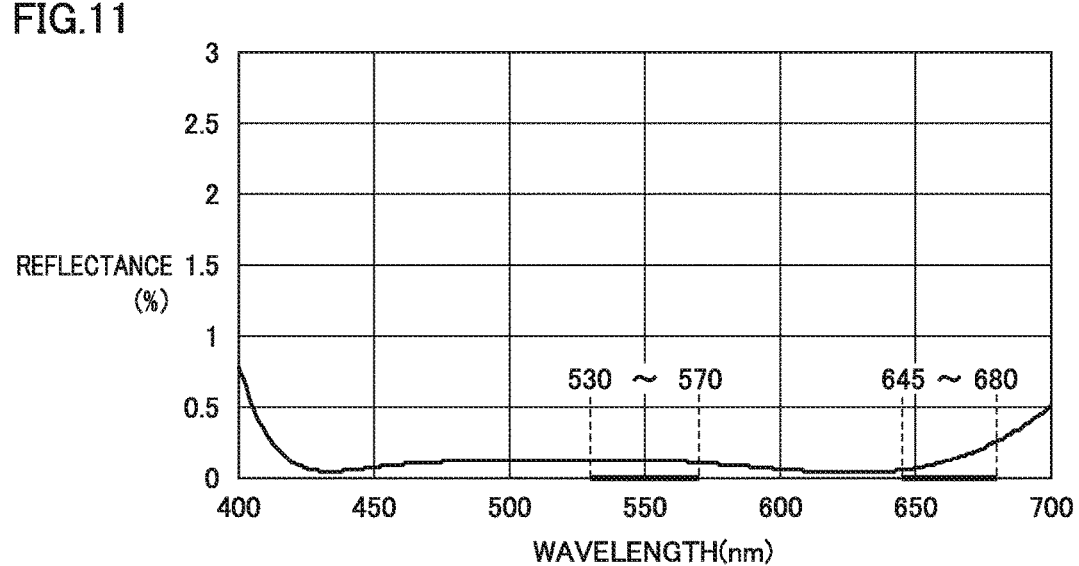
FIG. 11 is a diagram showing a spectral reflectance in Comparative Example 1.

FIG. 10 shows a construction of an antireflection coating of a lens in Comparative Example 1 and FIG. 11 shows a spectral reflectance in Comparative Example 1. BK7 is employed for the lens shown in FIG. 10, and $MgF_2$ (having an index of refraction of 1.385 and a physical film thickness of 26.6 nm), $AL_2O_3$ (having an index of refraction of 1.62 and a physical film thickness of 100.6 nm), $TiO_2+La_2O_3$ (having an index of refraction of 2.1 and a physical film thickness of 124.1 nm), and $MgF_2$ (having an index of refraction of 1.385 and a physical film thickness of 95.1 nm) are successively stacked as a first layer film, a second layer film, a third layer film, and a fourth layer film, respectively.

Consequently, as seen in a graph showing relation between a wavelength (nm) and a reflectance (%) shown in FIG. 11, a reflectance of the antireflection coating does not have a relative minimum value in a range of wavelengths from 645 nm to 680 nm and either in a range of wavelengths from 530 nm to 570 nm.

Though film materials including $TiO_2+La_2O_3$, $Al_2O_3$, and $MgF_2$ are described in each of Examples and Comparative Example above, the film materials are not limited to these types, and a titanium oxide containing material, an aluminum oxide containing material, and magnesium fluoride or silicon dioxide may be employed as a high refraction index material, an intermediate refraction index material, and a low refraction index material, respectively.

EXAMPLE 4

Figure 12:
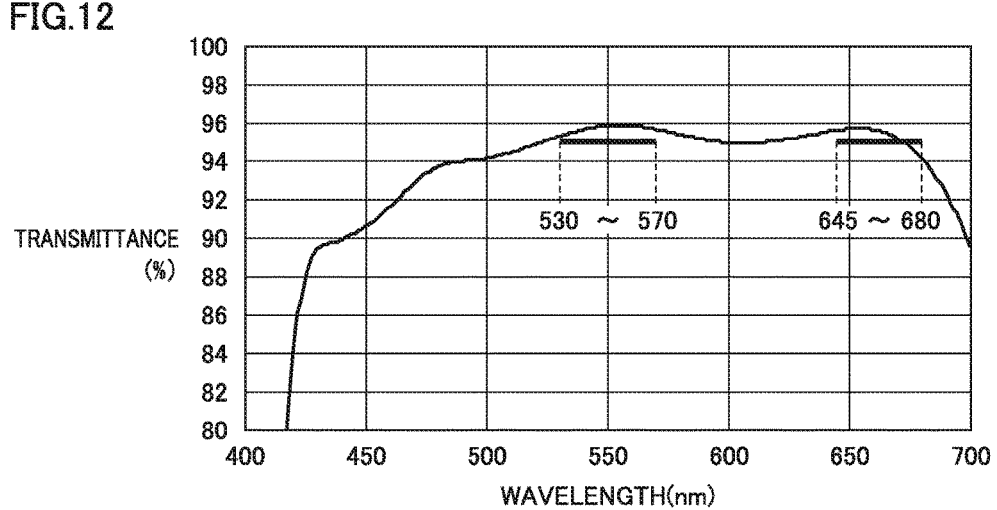
FIG. 12 is a diagram showing a total-system transmittance on an optical axis of a projection lens in Example 4.

FIG. 12 shows a total-system transmittance on an optical axis of a projection lens in Example 4. The total-system transmittance has a relative maximum value in a range of wavelengths not shorter than 530 nm and not longer than 570 nm and in a range of wavelengths not shorter than 645 nm and not longer than 680 nm. This projection lens is obtained, for example, by providing an antireflection coating having a spectral reflectance as in Example 1 to Example 3 described above on a surface of half or more of lenses.

EXAMPLE 5

Figure 13:
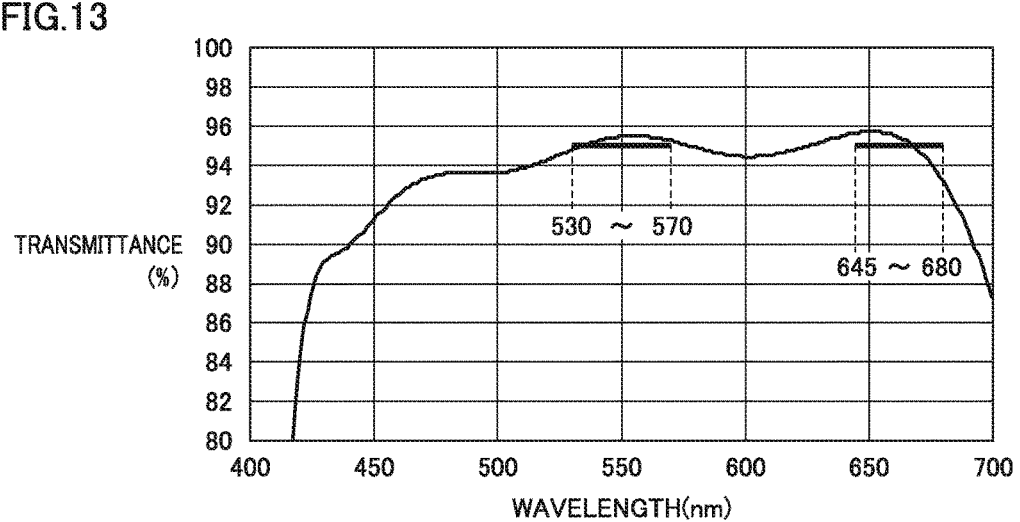
FIG. 13 is a diagram showing a total-system transmittance on an optical axis of a projection lens in Example 5.

FIG. 13 shows a total-system transmittance on an optical axis of a projection lens in Example 5. The total-system transmittance has a relative maximum value in a range of wavelengths not shorter than 530 nm and not longer than 570 nm and in a range of wavelengths not shorter than 645 nm and not longer than 680 nm. This projection lens is obtained, for example, by providing an antireflection coating having a spectral reflectance as in Example 1 to Example 3 described above on a surface of half or more of lenses.

EXAMPLE 6

Figure 14:
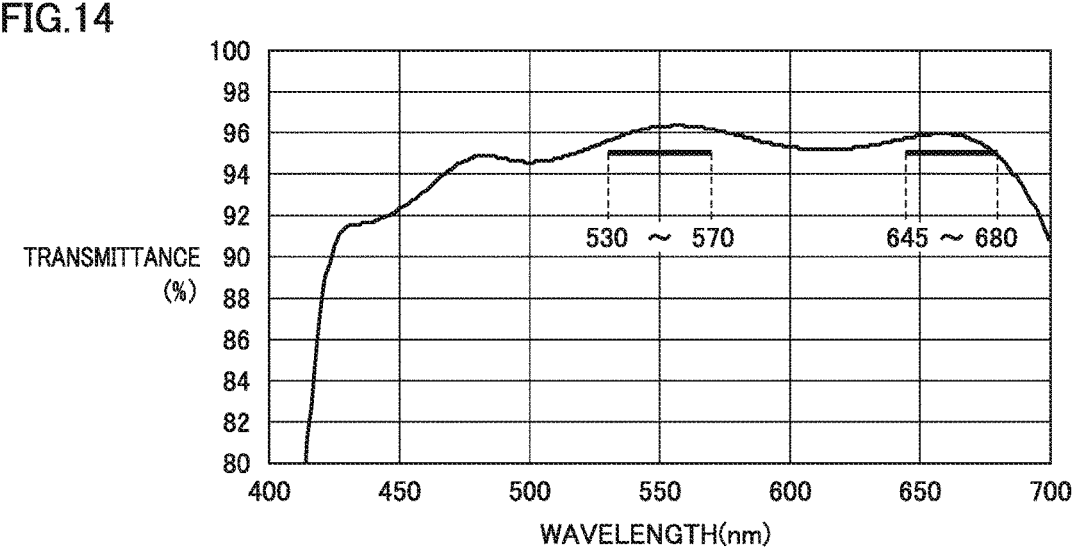
FIG. 14 is a diagram showing a total-system transmittance on an optical axis of a projection lens in Example 6.

FIG. 14 shows a total-system transmittance on an optical axis of a projection lens in Example 6. The total-system transmittance has a relative maximum value in a range of wavelengths not shorter than 530 nm and not longer than 570 nm and in a range of wavelengths not shorter than 645 nm and not longer than 680 nm. This projection lens is obtained, for example, by providing an antireflection coating having a spectral reflectance as in Example 1 to Example 3 described above on a surface of half or more of lenses.

A difference in construction among the projection lenses in Example 4 to Example 6 will now be described. Example 4 is directed to a projection lens optical system including 16 lenses, in which the number of surfaces to which an antireflection coating is applied is 32. Example 5 is directed to a projection lens optical system including 17 lenses, in which the number of surfaces to which an antireflection coating is applied is 34. Example 6 is directed to a projection lens optical system including 15 lenses, in which the number of surfaces to which an antireflection coating is applied is 30.

COMPARATIVE EXAMPLE 2

Figure 15:
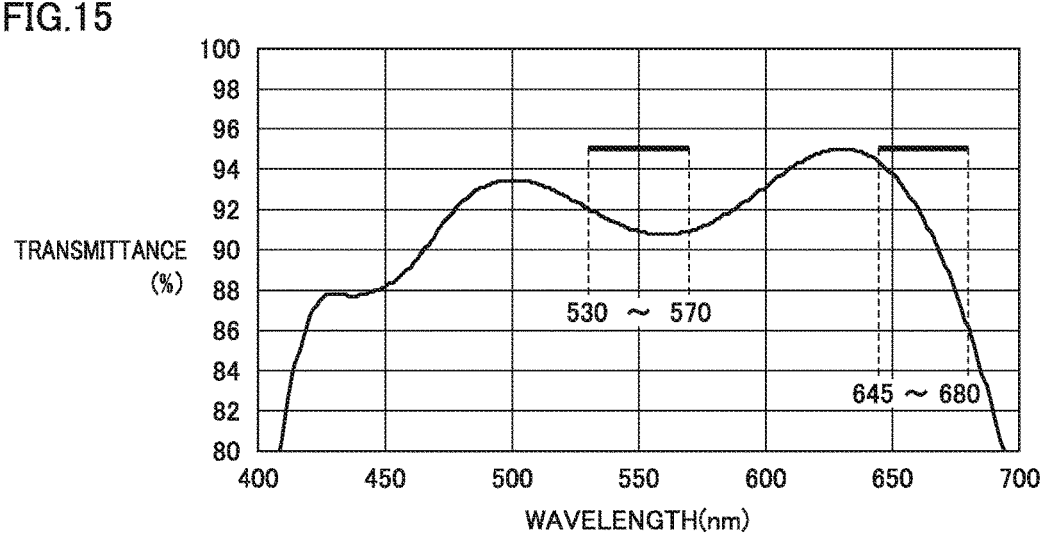
FIG. 15 is a diagram showing a total-system transmittance on an optical axis of a projection lens in Comparative Example 2.

FIG. 15 shows a total-system transmittance on an optical axis of a projection lens in Comparative Example 2. The total-system transmittance does not have a relative maximum value in a range of wavelengths not shorter than 530 nm and not longer than 570 nm and in a range of wavelengths not shorter than 645 nm and not longer than 680 nm. This projection lens is obtained, for example, by providing an antireflection coating having a spectral reflectance as in Comparative Example 1 described above on a lens surface.

COMPARATIVE EXAMPLE 3

Figure 16:
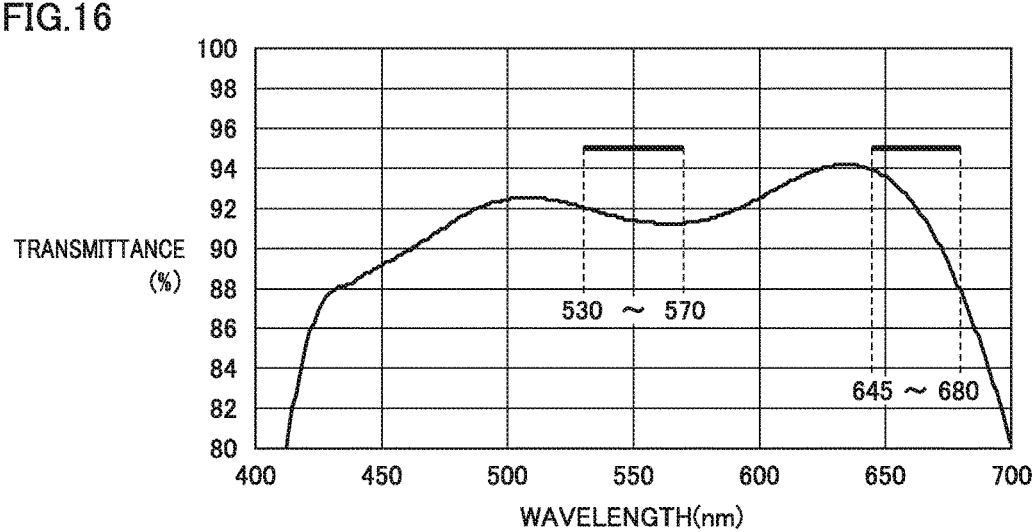
FIG. 16 is a diagram showing a total-system transmittance on an optical axis of a projection lens in Comparative Example 3.

FIG. 16 shows a total-system transmittance on an optical axis of a projection lens in Comparative Example 3. The total-system transmittance does not have a relative maximum value in a range of wavelengths not shorter than 530 nm and not longer than 570 nm and in a range of wavelengths not shorter than 645 nm and not longer than 680 nm. This projection lens is obtained, for example, by providing an antireflection coating having a spectral reflectance as in Comparative Example 1 described above on a lens surface.

COMPARATIVE EXAMPLE 4

Figure 17:
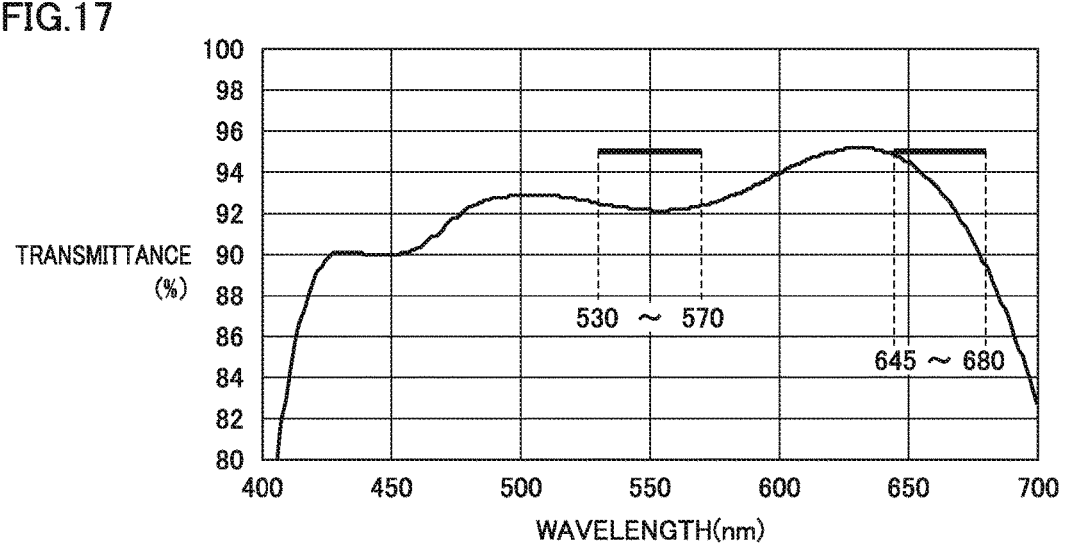
FIG. 17 is a diagram showing a total-system transmittance on an optical axis of a projection lens in Comparative Example 4.

FIG. 17 shows a total-system transmittance on an optical axis of a projection lens in Comparative Example 4. The total-system transmittance does not have a relative maximum value in a range of wavelengths not shorter than 530 nm and not longer than 570 nm and in a range of wavelengths not shorter than 645 nm and not longer than 680 nm. This projection lens is obtained, for example, by providing an antireflection coating having a spectral reflectance as in Comparative Example 1 described above on a lens surface.

A difference in construction among the projection lenses in Comparative Example 2 to Comparative Example 4 will now be described. Comparative Example 2 is directed to a projection lens optical system including 16 lenses, in which the number of surfaces to which an antireflection coating is applied is 32. Comparative Example 3 is directed to a projection lens optical system including 17 lenses, in which the number of surfaces to which an antireflection coating is applied is 34. Comparative Example 4 is directed to a projection lens optical system including 15 lenses, in which the number of surfaces to which an antireflection coating is applied is 30. Therefore, a pair of Example 4 and Comparative Example 2, a pair of Example 5 and Comparative Example 3, and a pair of Example 6 and Comparative Example 4 are the pairs each having the same projection lens optical system but having different antireflection coatings.

In Comparative Example 2 to Comparative Example 4, a transmittance in a range of wavelengths not shorter than 530 nm and not longer than 570 nm and in a range of wavelengths not shorter than 645 nm and not longer than 680 nm is approximately from 91% to 92%, whereas in Example 4 to Example 6, a transmittance in a range of wavelengths not shorter than 530 nm and not longer than 570 nm and in a range of wavelengths not shorter than 645 nm and not longer than 680 nm improves to 94% or higher. An effect of improvement in brightness could be confirmed based on the present Examples and Comparative Examples.

EXAMPLE 7

Figure 18:
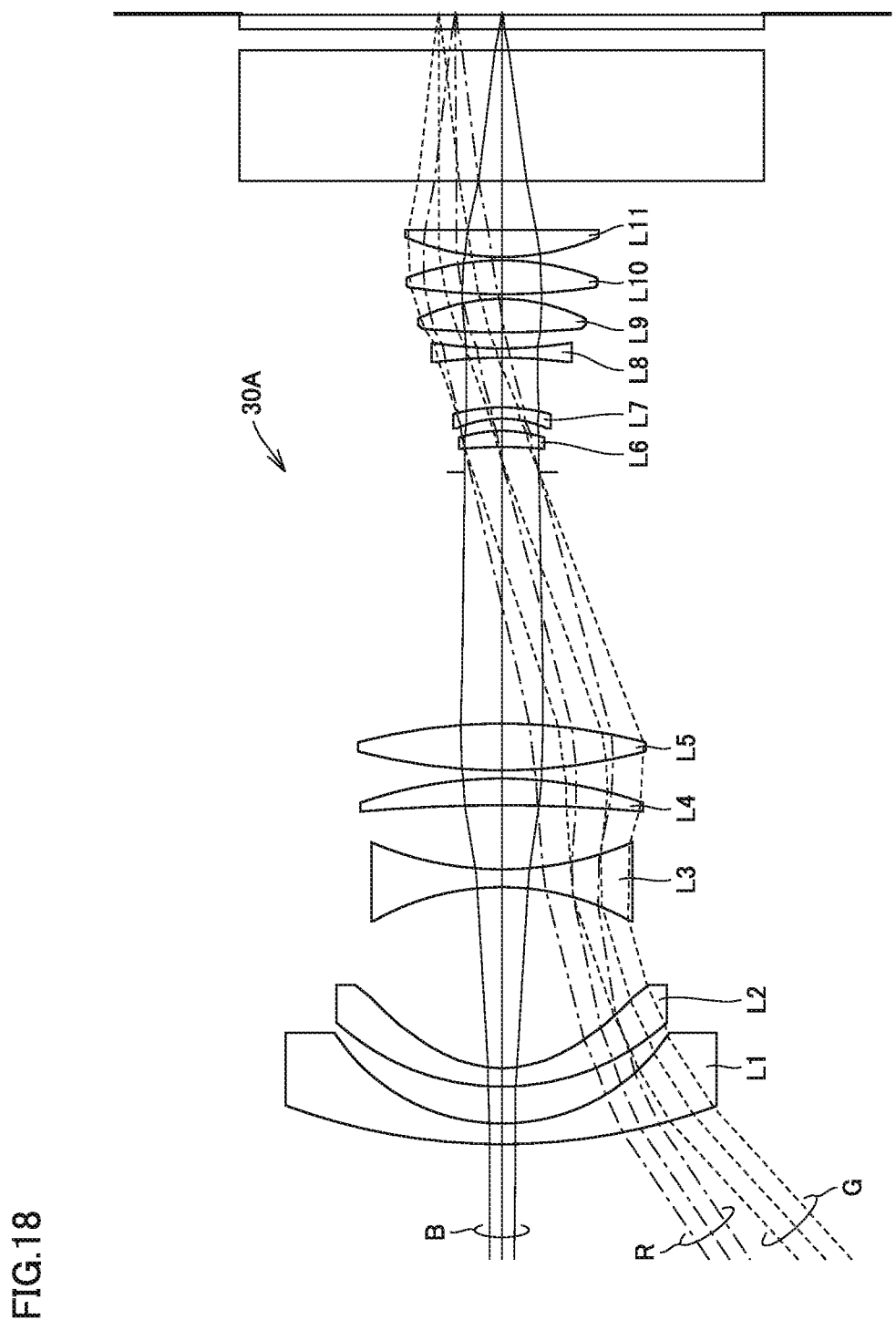
FIG. 18 is a diagram showing a construction of a projection lens in Example 7.

The number of applied lenses (surfaces) was confirmed in Example 7. FIG. 18 shows a construction of a projection lens 30A in the present example. In a system of projection lens 30A, 11 lenses L1 to L11 in total are included. A case that antireflection coatings on all lens surfaces are formed from antireflection coatings in a conventional example is denoted as "no change," a case that half of antireflection coatings on all lenses have been changed to antireflection coatings having a spectral reflectance as high as in Example 1 is denoted as "change in half," and a case that antireflection coatings on all lens surfaces have been changed to antireflection coatings having a spectral reflectance as high as in Example 1 is denoted as "change in all."

Figure 19:
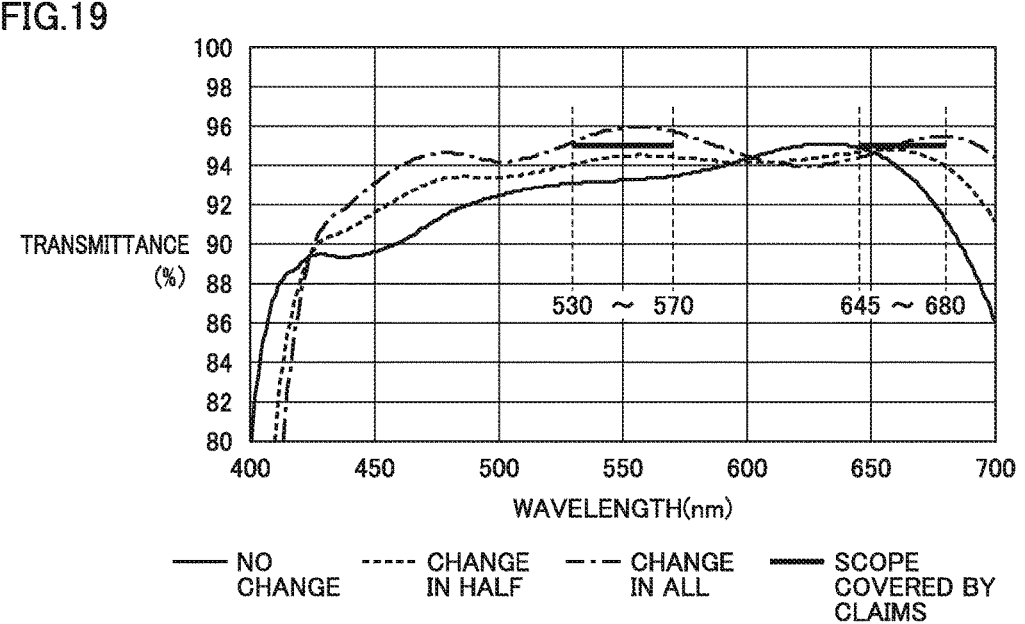
FIG. 19 is a diagram showing a total-system transmittance on an optical axis of a projection lens in Example 7.

FIG. 19 shows a total-system transmittance on an optical axis of projection lens 30A. "Change in all" and "change in half" have a relative maximum value in a range of wavelengths not shorter than 530 nm and not longer than 570 nm and in a range of wavelengths not shorter than 645 nm and not longer than 680 nm. "No change" does not have a relative maximum value in a range of wavelengths not shorter than 530 nm and not longer than 570 nm and in a range of wavelengths not shorter than 645 nm and not longer than 680 nm.

Figure 20:
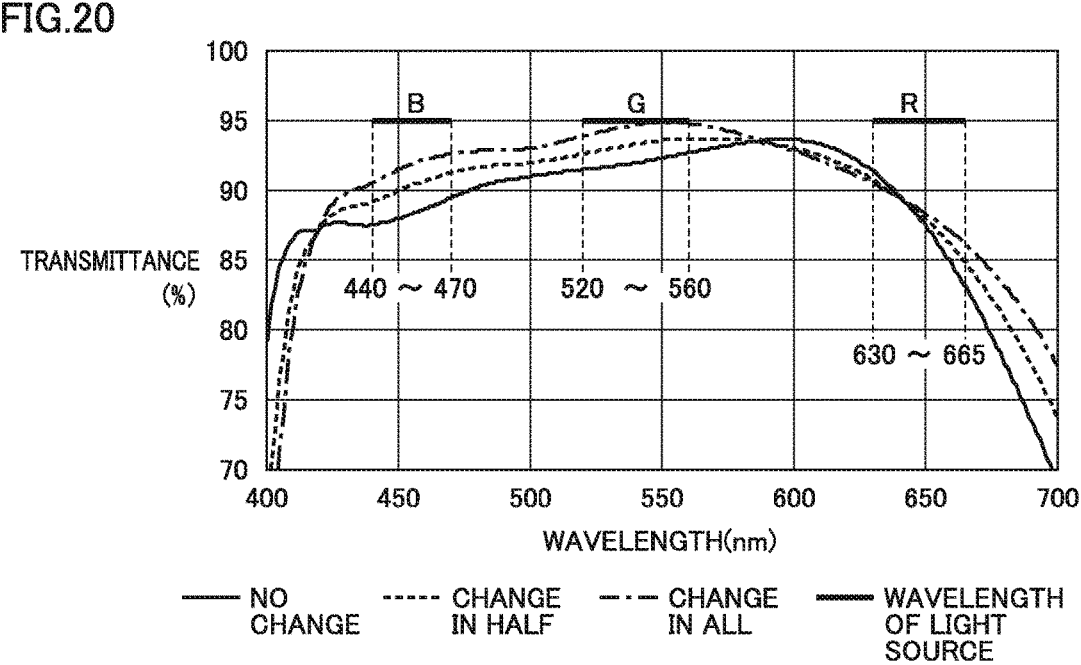
FIG. 20 is a diagram showing a total-system transmittance off the optical axis of a projection lens in Example 7.

FIG. 20 shows a total-system transmittance off the optical axis of projection lens 30A. In a red wavelength range off the optical axis, an effect in improvement in transmittance in "change in half" and "change in all" can be confirmed, because lowering in transmittance of light beams at a high angle of incidence is less likely. It seems that an effect in improvement in transmittance can be obtained in a wavelength range from 645 nm to 680 nm and a wavelength range from 530 nm to 570 nm by shift by 10 nm to 15 nm toward a longer wavelength from a range of wavelengths of laser beams, on the premise that a transmittance of off-axis light shifts toward a shorter wavelength.

Relation between the number of applied lenses to which an antireflection coating in the present example has been applied and a transmittance will be described with reference to FIG. 21. FIG. 21 is a diagram showing a "total-system transmittance (W (B, G, R))," a "blue transmittance (B: a wavelength from 440 nm to 470 nm)," a "green transmittance (G: a wavelength from 520 nm to 560 nm)," and a "red transmittance (R: a wavelength from 630 nm to 665 nm)" on and off the optical axis. It could be confirmed that, with increase in number of applied lenses to which the antireflection coating in the present example had been applied, the "total-system transmittance" of projection lens 30A was higher.

EXAMPLE 8

In Example 8, in a system of a projection lens 30B having 19 lenses, the lenses were grouped into three groups of 6 lenses, 6 lenses, and 7 lenses, respectively, and a difference depending on a position of application of a lens to which an antireflection coating having a spectral reflectance as high as in Example 1 was applied was checked.

Figure 22:
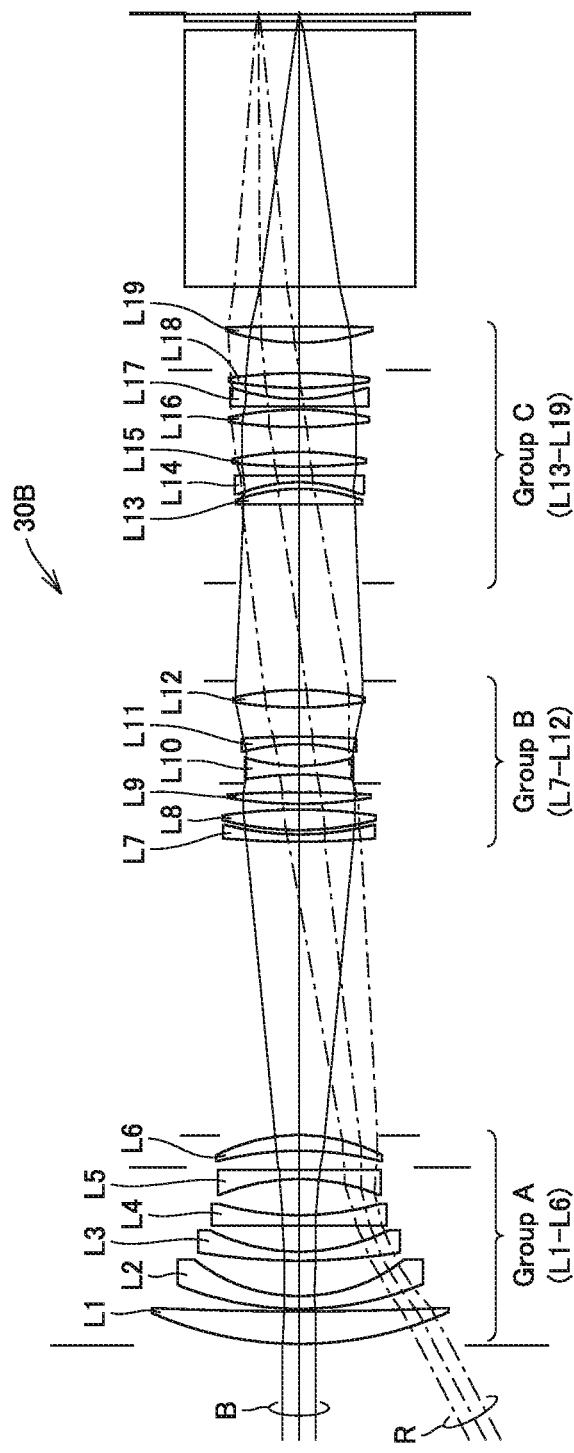
FIG. 22 is a diagram showing a construction of a projection lens in Example 8.

FIG. 22 shows a construction of projection lens 30B. Group-A has lens L1 to lens L6. Group-B has lens L7 to lens L12. Group-C has lens L13 to lens L19. A total-system transmittance in a case of application to all groups and a case of application to two groups was checked, with the lenses being grouped into three groups of Group-A, Group-B, and Group-C.

Specifically, as shown in FIG. 23, application to all of Group-A to Group-C is referred to as "change in all," application to Group-A and Group-B is referred to as "change in AB," application to Group-A and Group-C is referred to as "change in AC," and application to Group-B and Group-C is referred to as "change in BC."

Figure 24:
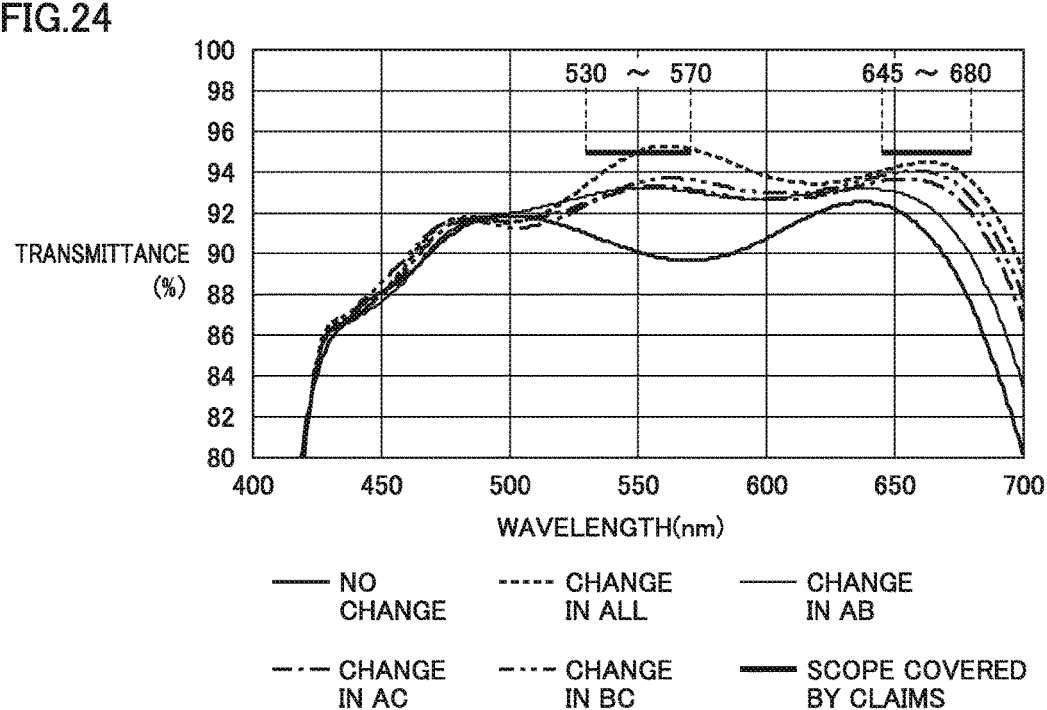
FIG. 24 is a diagram showing a total-system transmittance on an optical axis of the projection lens in Example 8.

FIG. 24 shows a total-system transmittance on an optical axis of projection lens 30B. "Change in all," "change in AB," "change in AC," and "change in BC" have a relative maximum value in a range of wavelengths not shorter than 530 nm and not longer than 570 nm and in a range of wavelengths not shorter than 645 nm and not longer than 680 nm. "No change" does not have a relative maximum value in the range of wavelengths not shorter than 530 nm and not longer than 570 nm and in the range of wavelengths not shorter than 645 nm and not longer than 680 nm.

Figure 25:
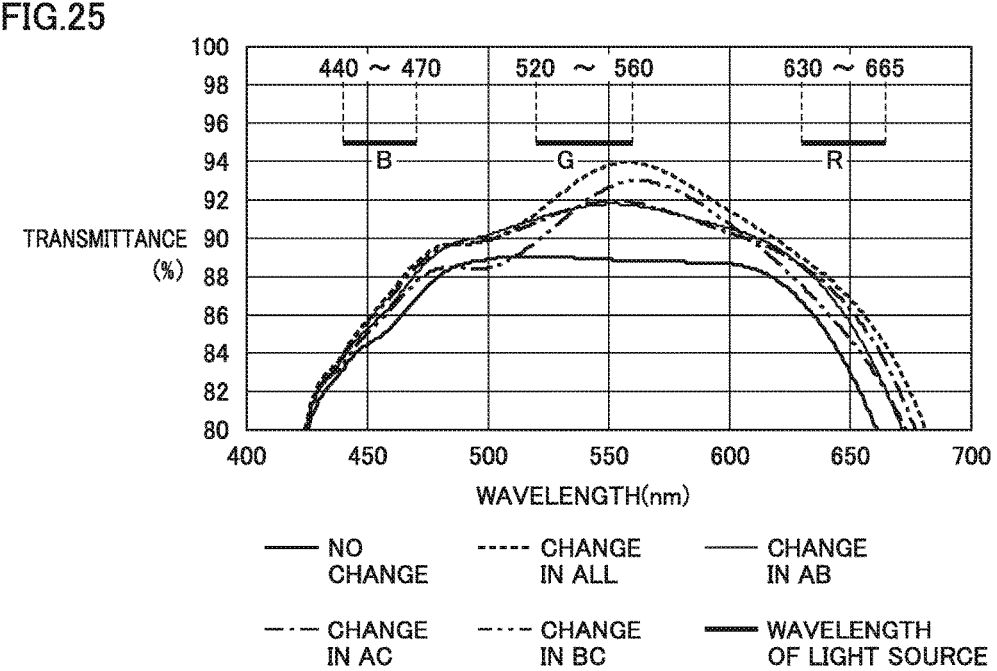
FIG. 25 is a diagram showing a total-system transmittance off the optical axis of the projection lens in Example 8.

FIG. 25 shows a total-system transmittance off the optical axis of projection lens 30B. In a red wavelength range off the optical axis, an effect in improvement in transmittance in "change in all," "change in AB," "change in AC," and "change in BC" can be confirmed, because lowering in transmittance of light beams at a high angle of incidence is less likely. It seems that an effect from shift by 10 nm to 15 nm toward a longer wavelength from a range of wavelengths of laser beams can be obtained in a wavelength range from 645 nm to 680 nm and in a wavelength range from 530 nm to 570 nm, on the premise that a transmittance of off-axis light shifts toward a shorter wavelength.

Relation between a transmittance and "no change," "change in all," "change in AB," "change in AC," and "change in BC" of lenses to which an antireflection coating has been applied in projection lens 30B in the present example will be described with reference to FIG. 26. FIG. 26 is a diagram showing a "total-system transmittance (W (B, G, R))," a "blue transmittance (B: a wavelength from 440 nm to 470 nm)," a "green transmittance (G: a wavelength from 520 nm to 560 nm)," and a "red transmittance (R: a wavelength from 630 nm to 665 nm)" on and off the optical axis. It could be confirmed that an effect from change in Group-C was high because a transmittance in "change in AC" and "change in BC" was high on the optical axis. It could be confirmed that an effect from change in Group-A was high because a transmittance in "change in AB" and "change in AC" was high off the optical axis.

For example, when change in antireflection coating is applied only to some lenses, a higher effect under limited conditions can be expected by application to a particularly effective position as above.

The projection lens and the projector adopting the projection lens according to one or more embodiments above achieve an effect of improvement in brightness. In particular, the effect is obtained for red light and green light which tend to be insufficient in laser light sources.

An effect of improvement in brightness in one or more embodiments is obtained with a projection lens included in a projector using laser beams as a light source, the laser beams including as the light source, first blue laser beams, second blue laser beams, first green laser beams, second green laser beams, first red laser beams, and second red laser beams, which are different in wavelength range, and the projection lens having a relative maximum value of a transmittance on an optical axis in a range of wavelengths not shorter than 645 nm. In particular, an effect is obtained for red light and green light which tend to be insufficient in laser light sources.

Without being limited to the laser light source, a similar effect can be obtained with a projection lens included in a projector including a light source, the light source including a first blue light source, a second blue light source, a first green light source, a second green light source, a first red light source, and a second red light source, which are different in wavelength range, and the projection lens having a relative maximum value of a transmittance on an optical axis between a wavelength not shorter than 645 nm and a wavelength not longer than 680 nm.

Although embodiments of the present invention have been described and illustrated in detail, it is clearly understood that the same is by way of illustrated and example only and is not to be taken by way of limitation, the scope of the present invention being interpreted by terms of the appended claims.

What is claimed is:
1. A projector comprising:
a light source that emits a blue laser beam, green laser beam, and red laser beam which are different in wavelength range;
a plurality of projection lenses, wherein a first transmittance value of the plurality of projection lenses over a total-system transmittance is maximized on an optical axis between a wavelength not shorter than 645 nm and a wavelength not longer than 680 nm;
an antireflection coating that minimizes a first reflectance value of the plurality of projection lenses over the total-system transmittance between the wavelength not shorter than 645 nm and the wavelength not longer than 680 nm is disposed on a surface of half or more of the plurality of projection lenses, wherein
the total-system transmittance is a transmittance of light passing through the plurality of projections lenses, and
the antireflection coating comprises:
a high refraction index material comprising lanthanum oxide and titanium oxide ($La_2O_3+TiO_2$);

an intermediate refraction index material comprising aluminum oxide ($Al_2O_3$); and
a low refraction index material comprising magnesium fluoride ($MgF_2$) or silicon dioxide ($SiO_2$).

2. The projector according to claim 1, wherein the first transmittance value of the plurality of projection lenses over the total-system transmittance is maximized on the optical axis between a wavelength not shorter than 660 nm and the wavelength not longer than 680 nm.

3. The projector according to claim 1, wherein the antireflection coating minimizes the first reflectance value of the plurality of projection lenses over the total-system transmittance between a wavelength not shorter than 660 nm and the wavelength not longer than 680 nm.

4. The projector according to claim 1, wherein a second transmittance value of the plurality of projection lenses over the total-system transmittance is maximized on an optical axis of the plurality of projection lenses between a wavelength not shorter than 530 nm and a wavelength not longer than 570 nm.

5. The projector according to claim 4, wherein the antireflection coating minimizes a second reflectance value of the plurality of projection lenses over the total-system transmittance between the wavelength not shorter than 530 nm and the wavelength not longer than 570 nm.

6. The projector according to claim 4, wherein the second transmittance value of the plurality of projection lenses over the total-system transmittance is maximized on the optical axis of the plurality of projection lenses between a wavelength not shorter than 550 nm and the wavelength not longer than 570 nm.

7. The projector according to claim 6, wherein the antireflection coating minimizes a second reflectance value of the plurality of projection lenses over the total-system transmittance between the wavelength not shorter than 550 nm and the wavelength not longer than 570 nm.

8. The projector according to claim 1, wherein the plurality of projection lenses includes a greatest or second greatest relative maximum value of transmittance between the wavelength not shorter than 645 nm and the wavelength not longer than 680 nm, among relative maximum transmittance values of transmittance between wavelengths of 400 nm and 700 nm.

9. A plurality of projection lenses of a projector comprising a light source that emits a blue laser beam, green laser beam, and red laser beam which are different in wavelength range, wherein a first transmittance value of the plurality of projection lenses over a total-system transmittance is maximized on an optical axis between a wavelength not shorter than 645 nm and a wavelength not longer than 680 nm, the plurality of projection lenses comprising:
an antireflection coating that minimizes a first reflectance value of the plurality of projection lenses over the total-system transmittance between the wavelength not shorter than 645 nm and the wavelength not longer than 680 nm is disposed on a surface of half or more of the plurality of projection lenses, wherein
the total-system transmittance is a transmittance of light passing through the plurality of projections lenses, and
the antireflection coating comprises:
a high refraction index material comprising lanthanum oxide and titanium oxide ($La_2O_3+TiO_2$),
an intermediate refraction index material comprising aluminum oxide ($Al_2O_3$), and
a low refraction index material comprising magnesium fluoride ($MgF_2$) or silicon dioxide ($SiO_2$).

10. A projector comprising:
a light source that emits a blue laser beam, green laser beam, and red laser beam which are different in wavelength range;
a plurality of projection lenses, wherein a first transmittance value of the plurality of projection lenses over a total-system transmittance is maximized on an optical axis in a range of wavelengths not shorter than 645 nm;
an antireflection coating that minimizes a first reflectance value of the plurality of projection lenses over the total-system transmittance between the wavelength not shorter than 645 nm is disposed on a surface of half or more of the plurality of projection lenses, wherein
the total-system transmittance is a transmittance of light passing through the plurality of projections lenses, and
the antireflection coating comprises:
a high refraction index material comprising lanthanum oxide and titanium oxide ($La_2O_3+TiO_2$),
an intermediate refraction index material comprising aluminum oxide ($Al_2O_3$), and
a low refraction index material comprising magnesium fluoride ($MgF_2$) or a silicon dioxide ($SiO_2$).

11. A projector comprising:
a blue light source, green light source, and red light source which are different in wavelength range;
a plurality of projection lenses, wherein a first transmittance value of the plurality of projection lenses over a total-system transmittance is maximized on an optical axis between a wavelength not shorter than 645 nm and a wavelength not longer than 680 nm;
an antireflection coating that minimizes a first reflectance value of the plurality of projection lenses over the total-system transmittance between the wavelength not shorter than 645 nm and the wavelength not longer than 680 nm is disposed on a surface of half or more of the plurality of projection lenses, wherein
the total-system transmittance is a transmittance of light passing through the plurality of projections lenses, and
the antireflection coating comprises:
a high refraction index material comprising lanthanum oxide and titanium oxide ($La_2O_3+TiO_2$),
an intermediate refraction index material comprising aluminum oxide ($Al_2O_3$), and
a low refraction index material comprising magnesium fluoride ($MgF_2$) or a silicon dioxide ($SiO_2$).

* * * * *